United States Patent Office 3,513,203
Patented May 19, 1970

3,513,203
FLUORINATED KETONES AND PROCESS FOR THEIR PREPARATION
Dario Sianesi, Milan, Renzo Fontanelli, Rome, and Gerardo Caporiccio, Milan, Italy, assignors to Montecatini Edison S.p.A., Milan, Italy, a corporation of Italy
No Drawing. Filed July 5, 1967, Ser. No. 651,128
Claims priority, application Italy, July 11, 1966, 15,969/66; Dec. 16, 1966, 31,193/66
Int. Cl. C07c 49/16
U.S. Cl. 260—594    2 Claims

ABSTRACT OF THE DISCLOSURE

Compounds of the formula

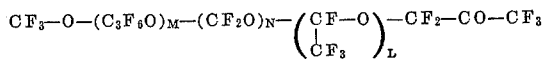

wherein M, N and L may each be zero or from 1 to 99, the sum of $M+N+L$ being zero or a number between 1 and 99, the ratio of $$\frac{N+L}{M+1}$$

being between zero and 2.

Compounds prepared by heating specified perfluorinated polyethers.

BACKGROUND OF THE INVENTION

Field of the invention

The present invention relates to new chemical compounds and mixtures thereof, characterized in that they consist solely of carbon, fluorine and oxygen atoms, are prevailingly of an oligomeric or polymeric nature, and contain a keto group. The present invention further relates to a process for obtaining these new compounds.

SUMMARY OF THE INVENTION

The compounds and mixtures thereof of the present invention have a chemical structure corresponding to the general formula

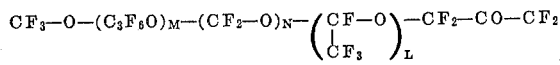

wherein: M, N and L may be the same or different numbers and each may be zero or a whole number from 1 to 99, the sum of $M+N+L$ being zero or a number between 1 and 99, the ratio of $$\frac{N+L}{M+1}$$

being a number between zero and 2, and preferably between zero and 1; $C_3F_6$ represents a perfluoroalkylene unit derived from the opening of the double bond of a hexafluoropropylene molecule; the different perfluoroalkylene units having a random distribution along the polymer chain, making up the molecules of the compounds, these units being bound to each other through atoms of etheric oxygen.

Compounds of the Formula I are obtained by heating specified perfluorinated polyethers as described subsequently.

DESCRIPTION OF THE PREFERRED EMBODIMENTS

By the process described hereinafter, the products of the invention are generally obtained in the form of mixtures of various compounds

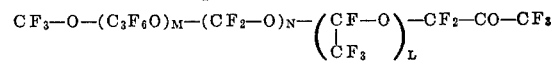

these compounds having different values of the indexes M, N and L. From these mixtures the individual compounds, namely the chemical compounds characterized by a precise number for M, N and L, may be isolated by conventional separation methods such as, e.g., fractional distillation.

Examples of these new compounds include:

perfluoromethoxy-acetone, $CF_3-O-CF_2-CO-CF_3$ (B.P. 8–10° C.);

perfluoro-4,7-dioxa-5-methyl-octanone-2,

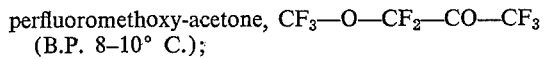

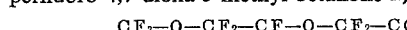

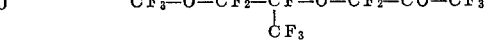

(B.P. 80–82° C. at 755 mm. Hg);

and higher homologues such as

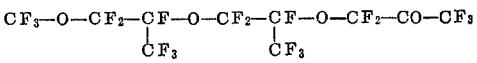

(B.P. 135–140° C.) and

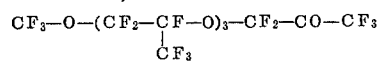

(B.P. 170–180° C.).

In addition, other pure compounds of series containing perfluoroalkylene units different from $C_3F_6$ have been separated and are described and characterized in Example 8.

For many uses, however, the ketonic compounds of the invention can be used in admixture with each other, without any difficulty, e.g., in the form of distillation cuts characterized by desired average values of M, N and L, wherein M, N and L are not necessarily whole numbers. Such mixtures have a more or less restricted molecular weight distribution and may contain oligomers of different or isomeric structure.

The process for preparation of the products

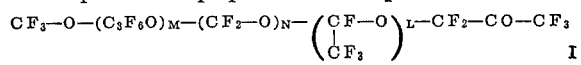

wherein M, N and L are as previously defined, and mixtures of said products, utilizes as the starting reactant perfluorinated polyethers of the general formula

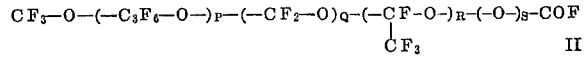

wherein P is a number between 1 and 100 and is the same or greater than $M+1$; Q and R may be zero or the same or different numbers between 1 and 66, but Q and R are the same or greater than, respectively, the numbers N and L; the ratio of $$\frac{(Q+R)}{P}$$

is a number between zero and 2, and preferably between zero and 1; (—O—) is a peroxidic oxygen atom that is disposed between two perfluoroalkylenoxy units; S is an average composition number from zero to 10; and the ratio $$\frac{S}{(P+Q+R)}$$

may be from zero to 0.1.

The process comprises heating perfluorinated polyether(s) of the foregoing Formula II at a temperature of from about 100° C. to 350° C. under a pressure of from about atmospheric to about 30 atmospheres, or alternatively heating at a temperature of from about 0° C. to 300° C. when operating in the presence of alkaline agents selected from the group consisting of organic tertiary nitrogen bases, oxides of electropositive metals and their salts of weak acids.

The starting materials, from which by chemical transformation are derived the fluorinated ketones of this invention, are obtained as the products of a photochemical reaction of oxygen with perfluoropropylene, as described in our U.S. patent application Ser. No. 650,257, filed on June 30, 1967, entitled "Fluorinated Oxygen-Containing Products and Process for the Preparation Thereof," the contents of said application being incorporated herein by reference.

More particularly, in said application there is described a process based on the direct photochemical combination of liquid $C_3F_6$ with oxygen, whereby there are obtained mixtures of compounds corresponding to the formulae

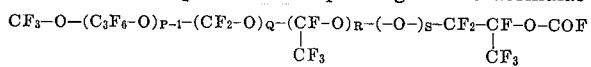

and

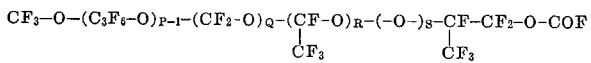

According to the present invention, when compounds of the foregoing formulas are heated to a temperature of at least 100° C., and preferably above 100° C., $COF_2$ is evolved along with the formation of new compounds with ketonic end groups, these new compounds being of the Formula I, namely,

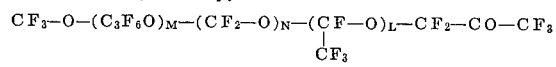

wherein the value of M is equal to or less than $P-1$, and wherein the peroxidic oxygen content is nil.

An example of this reaction is the transformation of perfluoro-1-methoxy-isopropyl fluoroformate,

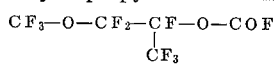

into $COF_2$+perfluoromethoxyacetone, $$CF_3-O-CF_2-CO-CF_3$$

which occurs by heating the former to 200–300° C.

A completely analogous reaction is obtained by heating the higher oligomers,

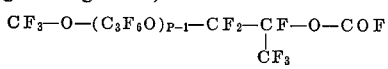

at temperatures higher than 100° C. and preferably between 200° and 350° C., with the formation of $COF_2$ and oligomers having ketonic end groups, $$CF_3-O-(C_3F_6O)_M-CF_2-CO-CF_3$$

Terminal ketonic groups are also obtained by thermal decomposition of polyethers having an analogous structure but with a terminal group

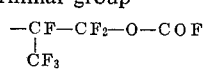

Products of this latter type are normally present in those polyethers directly obtainable by photochemical reaction of $C_3F_6$ with $O_2$. Such products are markedly more resistant to thermal transformation into polyethers with ketonic terminal groups.

However, in this case also, the prolonged action of high temperatures, e.g., between 250° and 350° C., causes the formation of terminal groups $-CF_2-CO-CF_3$ by partial demolition of the polyether chain.

It should be observed that ketonic compounds of the formula $CF_3-O-(C_3F_6O)_M-CF_2-CO-CF_3$ and obtainable by the action of heat from compounds of the formula $CF_3-O-(C_3F_6O)_{P-1}-X$ wherein X is either

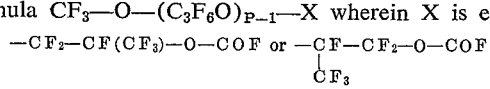

have an average M value that may be lower than the value of $P-1$. The overall reaction thus leads to the formation of compounds of the formula $$CF_3-O-(C_3F\ O)_M-CF_2-CO-CF_3$$

containing no peroxidic groups and having an average polymerization degree M that may be equal to or lower than the value of $P-1$.

It should also be noted that for polyethers having terminal ketonic groups of the formula

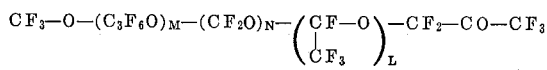

these products being obtained by heating products of the formula

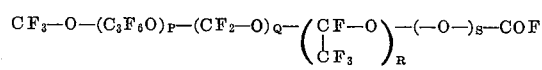

up to 350° C., the integers M, N and L may be the same as the respective values of $P-1$, Q and R, or may be lower such as e.g., $P-2$, $Q-1$, and $R-1$, respectively.

In general, the lower the number of peroxidic groups in the starting material and the lower the reaction temperature, the closer in the ketonic reaction products, are the values of the indexes M, N and L to the corresponding values of $P-1$, Q and R of the starting materials. Conversely, the higher the number of peroxidic groups in the starting material and the higher the temperature at which the process is carried out, the more pronounced becomes the degradation of the molecular chain, so that the final ketonic compounds will be characterized by average composition indexes M, N and L that are markedly lower than the corresponding values of $P-1$, Q and R.

An advantageous variation in the process for the synthesis of fluorinated ketones of the formula

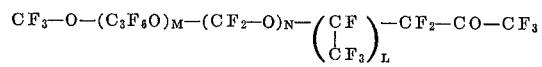

from products having functional groups of the type

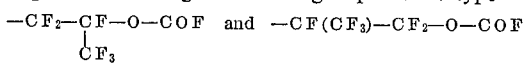

comprises treating these products with an agent of alkaline type and which does not contain active hydrogen atoms. Agents of this type include carbonates, oxides, oxalates, etc. of alkali and alkaline earth metals, and such other metals as, e.g., zinc, cadmium, aluminum, iron, etc.

Using this variation it is sufficient to utilize a relatively short contact time at temperatures from lower than room temperature up to about 300 C., for the acid polyethers, either as they are or in solution, e.g., using a perhalogenated solvent, with the alkaline agent present in an amount not less than that required for complete neutralization. This is followed by distillation so as to obtain, as distillate, the polyethers containing a ketonic terminal group.

The reaction time in order to achieve a substantial conversion of the starting material into ketones varies within very wide limits. It is thus possible to employ more than 24 hours when operating by simple heating. In contrast, 20–30 minutes is generally sufficient when the treatment is carried out in the presence of a suitable alkaline material.

The physical characteristics of the polyethers having a terminal ketonic group vary regularly by varying the values of M, N and L. The lower members, wherein M, N and L are zero, 1 or 2, are volatile low-boiling liquids, miscible in different organic solvents.

The higher members are viscous liquids having very low vapor pressures (boiling temperatures even higher than 350° C. at 0.1 mm. Hg), and are miscible only in certain perhalogenated solvents containing fluorine (e.g. CF₂Cl—CFCl₂, perfluorocyclobutane, perfluorodimethyl-cyclobutane, etc.).

All of these compounds generally have an extremely high thermal and oxidative resistance and this renders them highly useful in various fields, specifically, as lubricants, for applications wherein high temperatures and/or strongly oxidative conditions are to be encountered, as heat-exchange liquids, inert fluids for carrying out chemical reactions, etc.

These fluorinated ketones are characterized by the presence in the IR absorption spectrum of a characteristic band in the position of 1803 cm.⁻¹. In the IR spectrum for these compounds, on the contrary, there are virtually absent those absorptions which would indicate the presence of other chemically reactive groups such as acid fluoride groups. More particularly, absorptions at 1884 cm.⁻¹ (indicating the group —CF₂—COF), and at 1876 cm.⁻¹ (indicating the group

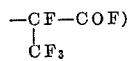

and around 1894 cm.⁻¹ (indicating the groups

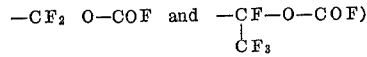

are all virtually absent.

In the nuclear magnetic resonance spectrum (NMR) of fluorine of this series of fluorinated ketones, the group —O—CF₂—CO—CF₃ is indicated by the resonance of 5 fluorine atoms in the zone at 75.0 p.p.m. (from CFCl₃). The peaks in the zones of 12.2 p.p.m. and 11.5 p.p.m., due to the groups

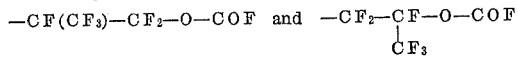

respectively, which groups are present in the starting product, are, on the contrary, completely absent.

In the same NMR spectrum of fluorine, the presence in the chain of the group —O—CF₂—CF(CF₃)—O— is indicated by the resonance of 5 fluorine atoms in the zone of +80 p.p.m. (from CFCl₃) and of 1 fluorine atom in the zone of +144 p.p.m. Resonance bands in the zones of +49 p.p.m. and +51 p.p.m. are due to the two fluorine atoms of the group —O—CF₂—O—, whereas bands in the zone of +55 p.p.m. show the presence in the chain of repeating units —(O—CF₂)ₙ— with n≥2. Resonance in the zone of 90 p.p.m. indicates the presence of the tertiary fluorine atom in the —O—CF(CF₃)—O— group.

In the following table, there are indicated the resonance bands of the various terminal groups that may be present in the starting material, and in part in the reaction product.

| Terminal groups | P.p.m. from CFCl₃ | Number of atoms of fluorine |
|---|---|---|
| CF₃—O—CF₂—CF(CF₃)—O— | +55.8 | 3 |
|  | +85.3 | 2 |
| CF₃—O—CF(CF₃)—CF₂—O— | +54 | 3 |
| CF₃—O—CF₂—O— | +57.8 | 3 |
| CF₃—O—CF(CF₃)—O— | +55.2 | 3 |
|  | +99 | 1 |
|  | +86.5 | 3 |
| —O—CF₂—CF(CF₃)—O—COF | +11.5 | 1 |
|  | +77.8 | 3 |
|  | +143 | 1 |
| —O—CF(CF₃)—CF₂—O—COF | +12.2 | 1 |
| —O—CF₂—O—COF | +14.8 to +15.0 | 1 |
|  | +58 to 59 | 2 |
| —O—CF₂—COF | −13.3 | 1 |
| —O—CF(CF₃)—COF | −26 | 1 |

There will now be described a preparation of the starting materials used in Examples 1 to 6 for the synthesis of ketonic compounds of the formula

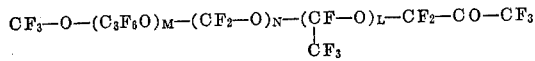

wherein M, N and L are as above defined.

A cylindrical glass reactor having a diameter of 245 mm. and a volume of 22 liters was assembled, in the center of which was inserted a quartz well containing a Hg vapour lamp of the Hanau TQ 1200 type.

Into the reactor were also placed a dipping tube for the introduction of oxygen, a thermometric well, and a gas outlet tube. The gas outlet tube was connected to a condenser cooled to −78° C. for condensing the volatile products and then recycling them back to the reactor. 25.7 kg. of liquid hexafluoropropylene at its boiling temperature (−29° C.) were introduced into the reactor and through it molecular oxygen was circulated at a flow rate of about 1,000 l./h. (liters per hour).

The photochemical reaction was continued for 17 hours, during which time the temperature of the reacting phase gradually rose to −10° C. Thereafter, unreacted perfluoropropylene and the volatile reaction products were distilled. From the latter, there were isolated 52 g. of perfluoro-1-methoxyisopropyl fluoroformate

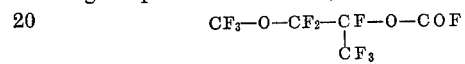

boil. temp. 51° C.; 67 g. of perfluoro-2(5-methyl-4,7-dioxa)octyl fluoroformate,

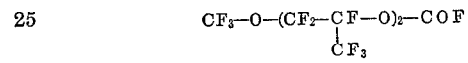

boiling temp. 85° C. at 270 mm. Hg; 75 g. of the homolog

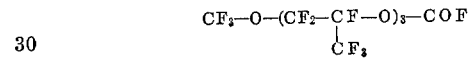

boiling temp. 82° C. at 35 mm. Hg; and 25 g. of the higher homolog

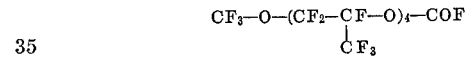

boiling temp. 93–5° C. at 20 mm. Hg.

There were also obtained minor amounts of the following pure compounds:

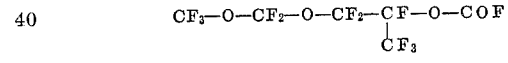

(B. temp. 80–85° C. at 760 mm. Hg);

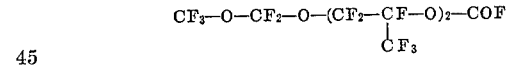

(B.T. 135–140° C. at 760 mm. Hg);

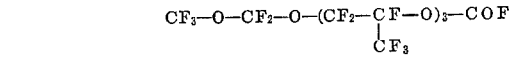

(B.T. 80–90° C. at 15 mm. Hg);

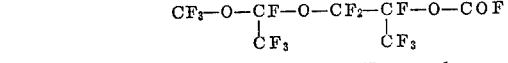

(B.T. 100–105° C. at 760 mm. Hg); and

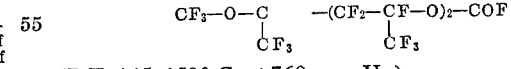

(B.T. 145–150° C. at 760 mm. Hg).

The residual reaction product (17.1 kg.) had an elemental composition corresponding to the formula $$C_3F_{5.99}O_{1.13}$$

Iodometric analysis showed it to contain 0.37 active oxygen atom per 10 oxygen atoms contained.

Molecular weight determinations showed that the product had an average molecular weight of 2400, with a ratio between

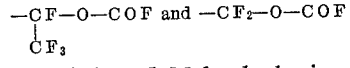

terminal groups of about 5. Molecules having a molecular weight between about 450 and about 10,000 were present.

NMR spectroscopic analysis indicated that the ratio

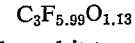

was about 12.

The following examples illustrate the present invention. All parts are by weight unless otherwise stated.

*Example 1.*—5 g. of perfluoro-1-methoxy-isopropyl fluoroformate, $$CF_3-O-CF_2-\underset{\underset{CF_3}{|}}{C}F-O-COF$$

were introduced by vacuum distillation into a stainless steel autoclave having a capacity of 50 cc. The autoclave was maintained at a temperature of 300° C. for a duration of 15 hours. At the end of this period the autoclave pressure had reached a constant value of about 30 atm. The contents of the autoclave were analyzed by a gas chromatography and appeared to consist essentially of an equimolecular mixture of $COF_2$ and $$CF_3-O-CF_2-CO-CF_3$$

perfluoro-1-methoxy-acetone, boiling point=8–10° C.

*Example 2.*—40 g. of $$CF_3-O-CF_2-\underset{\underset{CF_3}{|}}{C}F-O-COF$$

were slowly introduced at room temperature, under an anhydrous atmosphere, into a 250 cc. glass flask provided with a reflux condenser cooled with running water and containing about 50 g. of anhydrous $Na_2CO_3$ powder.

An exothermic reaction occurred with the evolution of gases which were collected in a vessel cooled with liquid nitrogen.

The contents of the flask were kept at a temperature of about 20° C. for a period of about 1 hour. Thereafter the product collected in the cooled vessel was subjected to fractional distillation, after removal of $CO_2$ contained therein.

16.0 g. of perfluoro-1-methoxyacetone, B.P. 8–10° C. and 21 g. of the starting fluoroformate were thus obtained. Essentially equivalent results were obtained by operating at room temperature under the same conditions, but using instead of $Na_2CO_3$ an excess of $KHCO_3$ or of ZnO or $Al_2O_3$ or of CaO or of pyridine as promoters for the decomposition of the fluoroformate group to form the ketonic group.

*Example 3.*—60 g. of $$CF_3-O-(CF_2-\underset{\underset{CF_3}{|}}{C}F-O)_2-COF$$

were heated in a 200 cc. autoclave for a period of 10 hours at a temperature of 250° C., and for a further 10 hours at a temperature of 300° C. At the end of this period no further increase of the internal pressure was observed. The contents of the autoclave were then subjected to fractional distillation in an anhydrous atmosphere, after removal of $COF_2$ contained therein.

35 g. of perfluoro-4,7-dioxa-5-methyl-octanone-2, $$CF_3-O-CF_2-\underset{\underset{CF_3}{|}}{C}F-O-CF_2-CO-CF_3$$

having a boiling temperature of 80–82° C. at 755 mm. Hg were thus obtained.

*Example 4.*—A sample of 50 g. of $$CF_3-O-(CF_2-\underset{\underset{CF_3}{|}}{C}F-O)_3-COF$$

was heated in a 200 cc. steel autoclave for a period of 24 hours at a temperature of 320–330° C. Thereafter, following cooling, there were removed the gaseous products consisting mainly of $COF_2$ and, by fractional distillation of the residue, there were obtained 34 g. of the compound $$CF_3-O-(CF_2-\underset{\underset{CF_3}{|}}{C}F-O)_2-CF_2-CO-CF_3$$

having a boiling temperature of 135–140° C. at 755 mm. Hg.

Another sample of 10 g. of $$CF_3-O-(CF_2-\underset{\underset{CF_3}{|}}{C}F-O)_3-COF$$

was introduced under an anhydrous atmosphere into a glass flask having a capacity of 50 cc. and containing 10 g. of $K_2CO_3$ in the form of a dry powder. An exothermic reaction occurred with the evolution of a gas prevailingly consisting of $CO_2$, while the temperature of the reacting phase was kept at about 20° C. by external cooling with running water.

After a period of mild agitation, the liquid contained in the reactor was subjected to fractional distillation, through which there were obtained 6 g. of the ketone $$CF_3-O-(CF_2-\underset{\underset{CF_3}{|}}{C}F-O)_2-CF_2-CO-CF_3$$

boiling temp. 136–139° C.

*Example 5.*—10 g. of $$CF_3-O-(CF_2-\underset{\underset{CF_3}{|}}{C}F-O)_4-COF$$

were introduced into a 100 cc. glass flask provided with a reflux condenser protected against atmospheric moisture and containing 20 g. of anhydrous $Na_2CO_3$. The mixture was kept for 2.5 hours at a temperature of 120–130° C. Thereafter, by fractional distillation under reduced pressure, there were obtained 6.2 g. of $$CF_3-O-(CF_2-\underset{\underset{CF_3}{|}}{C}F-O)_3-CF_2-CO-CF_3$$

having a boiling point between 160 and 180° C. at atmospheric pressure.

*Example 6.*—3.0 kg. of a product prepared as described above, which was the residue after distillation at 200° C. under atmospheric pressure, and having a ratio of about 5 between terminal groups $$-\underset{\underset{CF_3}{|}}{C}F-O-COF$$

and terminal groups $-CF_2-O-COF$, was heated in a steel vessel having a capacity of 3 liters provided with reflux condenser and cooled with running water, under atmospheric pressure and under anhydrous atmosphere, at a temperature of 350° C. for a period of 24 hours.

During this period there occurred the evolution of gaseous products, more particularly, of $COF_2$ (153 g.), $CF_3-COF$ (33 g.), perfluoropropylene epoxide (2.5 g.), and $C_3F_6$ (1.5 g.).

The residual product (about 2,800 g.), by elemental and spectroscopic analysis, appeared to consist prevailingly of a mixture of homologues $$CF_3-O-(C_3F_6O)_M-(CF_2-O)_N-\left(\underset{\underset{CF_2}{|}}{C}FO\right)_L-CF_2-CO-CF_3$$

with $M+N+L$ having a value between 2 and about 60, with a number average molecular weight of about 2,500.

The ratio $$\frac{(N+L)}{M}$$

was about 0.08 and the ratio $L/N$ was about 0.1. Thus, no peroxidic oxygen was present.

The mixture of oligomers was distilled without reflux, under a pressure of 0.1 mm. Hg, in a temperature range between about 20° C. and 350° C., with a practically continuous distillation curve. There also was present a fraction corresponding to about 15% by weight, distillable only above 350° C. at 0.1 mm. Hg. This residue appeared to have a number average molecular weight higher than 5,000.

*Example 7.*—The starting copolyether product used in this example was obtained by the following process.

1,080 g. of perfluoropropylene were introduced into an 800 cc. stainless steel autoclave provided with a pressure proof coaxial inner well of transparent quartz, with a dipping tube for the introduction of oxygen, and with a reflux condenser kept at a temperature of −80° C.

From a cylinder provided with a pressure regulator, oxygen was introduced through the dipping tube until a pressure of 5 atmospheres was reached.

By adjusting a discharge valve in the condenser line, an oxygen flow of 40 l./h. was maintained, keeping constant the pressure inside the reactor.

A high pressure U.V. lamp of the Hanau T.Q. 81 type was introduced into the quartz well and the reactor was cooled to +10 to +12° C.

Irradiation was thus carried out for 2 hours. At the end of this time the pressure was released and unreacted $C_3F_6$ was removed together with perfluoropropylene epoxide, bubbling these products through an alkaline washing bath.

842 g. of gaseous products were obtained consisting of unreacted $C_3F_6$ along with 10% of epoxide. The residue in the reactor consisted of 180 g. of oily polyether products having an elemental composition corresponding to the formula $CF_{1.96}O_{0.56}$ and an average molecular weight of 1,200.

By iodometric analysis a peroxidic oxygen content of 1.01 g. per 100 g. of product was determined.

By NMR analysis this product appeared to consist of polyether chains containing groups of the $-CF_2O-$ type together with $-CF_2-CF(CF_3)-O-$ groups in the molar ratio of about 1:2.

$-CF(CF_3)-O-$ units in an amount corresponding to 1/10 of the $-CF_2O-$ units were also present in the chain.

The terminal groups consisted of: $CF_3O-$ in the forms of $CF_3O-CF_2-CF(CF_3)-O-$, $CF_3O-CF_2-O-$ and $CF_3O-CF(CF_3)-O-$, and also of acid terminal preponderantly of the type $-O-CF_2-CF(CF_3)-OCOF$, and $-O-CF(CF_3)-CF_2OCOF$, the first of which was prevailing.

100 g. of this product were heated to 300° C. for 24 hours in a 0.2 liter oscillating autoclave. The pressure rose due to the formation of gases which at the end were discharged and appeared to consist prevailingly of $COF_2$ and $CF_3COF$.

After the addition of 20 g. of anhydrous $K_2CO_3$, the residual product (84 g.) was distilled, between 40° C. under atmospheric pressure and 200° C. at 0.2 mm. Hg.

75 g. of a neutral product were obtained, having an average molecular weight of about 1100. The elemental composition corresponded to the formula $CF_{1.99}O_{0.46}$.

Iodometric analysis showed that peroxidic oxygen was absent.

NMR analysis showed that the product contained terminal groups $CF_3O-$. These groups were of the three types already described along with the terminal group $-O-CF_2-CO-CF_3$, this latter group being present with respect to the former three in the ratio of 1:1.

The ratio between units $$-CF_2O- \text{ and } -CF_2-CF(CF_3)O-$$

was about 1:1.6. The $-CF(CF_3)O-$ groups were present in an amount of about 1:10 with respect to the $-CF_2O-$ units.

The product obtained had an average structural formula as follows:

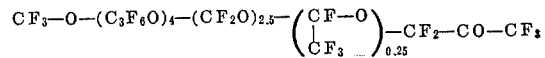

*Example 8.*—By using the same apparatus described in Example 7, a run was carried out by operating under an oxygen pressure of 3 atmospheres while keeping the temperature of the reactor at −5 to −8° C.

1,065 g. of perfluoropropylene were charged. At the end of the reaction, there resulted 705 g. of unreacted perfluoropropylene, 13 g. of perfluoropropylene epoxide, and 300 g. of oily copolyether products having an elemental composition corresponding to the formula $$CF_{1.98}O_{0.46}$$

and number average molecular weight of 3000.

By iodometric analysis a peroxidic oxygen content of 1.30 g. per 100 g. of product was determined. By NMR analysis this product appeared to consist of polyether chains containing groups of the $-CF_2-O-$ type together with groups of the $-CF(CF_3)-CF_2-O-$ type in a molar ratio of about 1:4.

$-CF(CF_3)-O-$ units were also present in amount corresponding to 1:10 of the $-CF_2-O-$ units. The terminal groups were the same as those of the products described in the preceding example.

Using the same procedure as described above, 1,000 g. of obtained polyether product were treated, in a 1.5-liter glass flask provided with agitator and reflux condenser, with 250 g. of anhydrous $Na_2CO_3$, and heated to a temperature of 150° C. for 5 hours.

Thereafter, the mixture was filtered and 800 g. of an oily product were thus obtained. Elemental analysis showed that the product corresponded to the formula $CF_{1.96}O_{0.40}$. From iodometric analysis it appeared that it did not contain peroxidic oxygen.

The product was subjected to fractional distillation. From the fractions, samples of the following compounds or oligomers of the same compositions and of isomeric structures were obtained. The compounds were separated in the pure state, their boiling temperatures at 760 mm. Hg were determined, and the results are reported hereinafter.

| Compound | Boiling point, °C. | Amount, g. |
|---|---|---|
| $CF_3-O-CF_2-CF(CF_3)O-CF_2-CO-CF_3$ | 83–4 | 2.0 |
| $CF_3-O-(CF_2-CF(CF_3)O)_2-CF-CO-CF_3$ | 137–8 | 2.5 |
| $CF_3-O-(CF_2-CF(CF_3)O)_3-CF_2-CO-CF_3$ | 180–1 | 2.5 |
| $CF_3-O-(CF_2-CF(CF_3)O)_4-CF_2-CO-CF_3$ | 215–6 | 3.2 |
| $CF_3-O-(CF_2-CF(CF_3)O)_5-CF_2-CO-CF_3$ | 245–6 | 2.3 |
| $CF_3-O(CF_2-CF(CF_3)O)_6-CF_2-CO-CF_3$ | 271–2 | 2.1 |
| $CF_3-O(CF_2-CF(CF_3)O)_7-CF_2-CO-CF_3$ | 294–6 | 1.8 |
| $CF_3O-CF_2O-CF_2-CO-CF_3$ | 48–50 | 0.8 |
| $CF_3O-CF_2O-CF_2-CF(CF_3)O-CF_2-CO-CF_3$ | 110–14 | 1.5 |
| $CF_3O-(CF_2O)-(CF_2CF(CF_3)O)_2CF_2-CO-CF_3$ | 157–60 | 1.2 |
| $CF_3O-(CF_2O)-(CF_2-CF(CF_3)O-)_3-CF_2CO-CF_3$ | 195–200 | 1.5 |
| $CF_3O-(CF_2O)-(CF_2-CF(CF_3)O-)_4CF_2-CO-CF_3$ | 230–235 | 0.5 |
| $CF_3O(CF_2O)_2-(CF_2-CF(CF_3)O-)_4-CF_2-CO-CF_3$ | 245–250 | 0.5 |
| $CF_3O(CF_2O)_2-(CF_2-CF(CF_3)O)_5-CF_2-CO-CF_3$ | 270–280 | 0.4 |
| $CF_3O-CF(CF_3)-O-CF_2-CO-CF_3$ | 68–69 | 0.4 |
| $CF_3O-CF(CF_3)-O-CF_2-CF(CF_3)-O-CF_2-CO-CF_3$ | 131–132 | 0.5 |
| $CF_3O-(CF(CF_3)O-)-(CF_2-CF(CF_3)-O-)_2-CF_2-CO-CF_3$ | 168–169 | 0.5 |
| 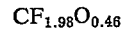 | 183–190 | 0.2 |

The undistilled residue consisted of 550 g. of a product having a number average molecular weight of about 3400 and an elemental composition corresponding to the formula $CF_{1.95}O_{0.39}$.

The product did not contain peroxidic oxygen.

NMR analysis showed it to have $CF_3O-$ terminal groups in the three forms $CF_3-O-CF_2-CF(CF_3)-$, $CF_3O-CF_2O-$ and $CF_3O-CF(CF_3)O-$ in the ratio of 10:3:0.3, and a ketonic terminal group $$-O-CF_2-COCF_3$$

this latter being present with respect to the sum of the other terminals, in a ratio of 1:1.

The total ratios between $-CF_2-O-$, $-C_3F_6O-$ and $-CF(CF_3)-O-$ units corresponded to those found in the starting product.

To this product the average formula

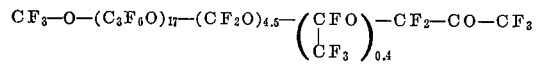

was attributed.

Variations can of course be made without departing from the spirit of our invention.

We claim:
1. Ketones having the general formula

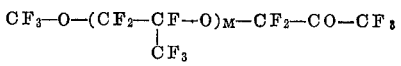

wherein M is zero or a whole number from 1 to 99.

2. A ketone of claim 1 having the structure

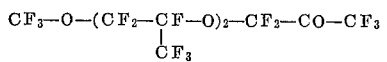

References Cited

UNITED STATES PATENTS

| | | | |
|---|---|---|---|
| 3,303,145 | 2/1967 | Carlson | 260—586 |
| 2,988,537 | 6/1961 | Wiley | 260—594 |

BERNARD HELFIN, Primary Examiner

W. B. LONE, Assistant Examiner

U.S. Cl. X.R.

252—54, 67, 364

UNITED STATES PATENT OFFICE
CERTIFICATE OF CORRECTION

Patent No. 3,513,203           Dated May 19, 1970

Inventor(s)  Dario Sianesi and Gerardo Caporiccio

It is certified that error appears in the above-identified patent and that said Letters Patent are hereby corrected as shown below:

Column 1, line 52, "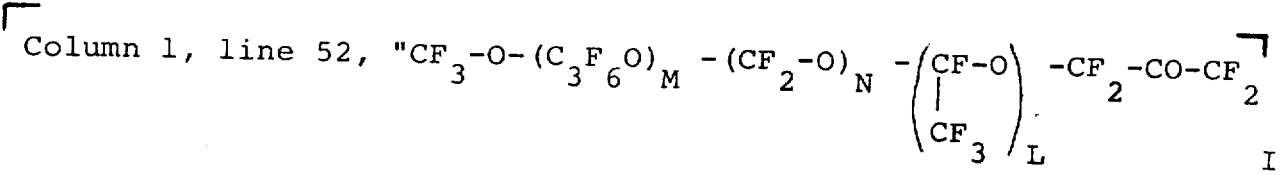

should read

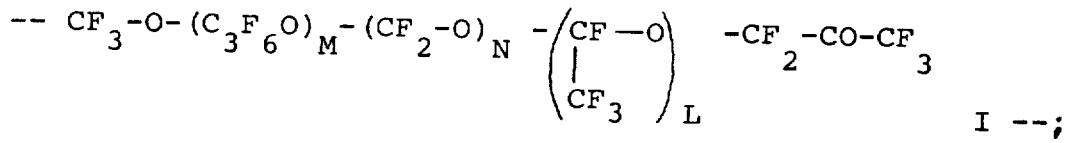 ;

lines 66, 67, 68 and 69, "units having a random distribution along the polymer chain making up the molecules of the compounds, these units being bound to each other through atoms of etheric oxygen." should read -- units making up the molecules of the compounds having a random distribution along the polymer chain, these units being bound to each other through ether bonds. --.

Column 2, line 5, "various compounds" should read -- various compounds having the general formula, --; line 46, "The process for preparation of the products" should read -- The process for preparation of the products of the formula --; lines 53 and 54, "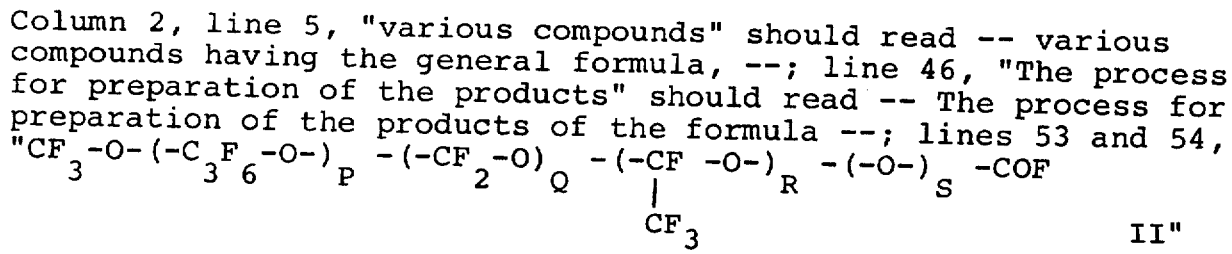

should read

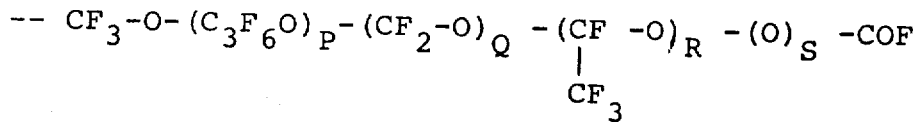 II --.

UNITED STATES PATENT OFFICE
CERTIFICATE OF CORRECTION

Patent No. 3,513,203                  Dated May 19, 1970

Inventor(s) Dario Sianesi and Gerardo Caporiccio

It is certified that error appears in the above-identified patent and that said Letters Patent are hereby corrected as shown below:

Column 4, line 9, "$CF_3-O-(C_3F\ O)_M -CF_2-CO-CF_3$" should read -- $CF_3-O-(C_3F_6O)_M -CF_2-CO-CF_3$, --; line 29, "the closer in" should read -- the closer, in --. Column 5, line 39, "product" should read -- material --.

Column 6, line 55, "$CF_3-O-\underset{\underset{CF_3}{|}}{C} -(CF_2-\underset{\underset{CF_3}{|}}{CF} -O)_2 -COF$" should read -- $CF_3-O-\underset{\underset{CF_3}{|}}{CF} -O-(CF_2-\underset{\underset{CF_3}{|}}{CF} -O)_2 -COF$ --. Column 7, line 41, "ZnO or $Al_2O_3$" should read -- ZnO or of $Al_2O_3$ --. Column 8, line 32, "160" should read -- 170 --; line 71, "copolyether product used" should read -- copolyether used --.

PO-1050
(5/69)

UNITED STATES PATENT OFFICE
CERTIFICATE OF CORRECTION

Patent No. 3,513,203       Dated   May 19, 1970

Inventor(s)  Dario Sianesi and Gerardo Caporiccio

It is certified that error appears in the above-identified patent and that said Letters Patent are hereby corrected as shown below:

Column 10, in the Table under "Amount":

line  6, "2.1" should read -- 2.3 -- .

line  7, "1.ε" should read -- 1.8 -- .

line  8, "0.8" should read -- 0.5 -- .

line  9, "1.5" should read -- 1.2 -- .

line 10, "1.2" should read -- 1.5 -- .

line 11, "1.5" should read -- 1.1 -- .

SIGNED AND
SEALED
DEC 15 1970

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,513,203            Dated May 19, 1970

Inventor(s) Dario Sianesi and Gerardo Caporiccio

It is certified that error appears in the above-identified patent and that said Letters Patent are hereby corrected as shown below:

Column 7, line 34, "$CO_2$" should read -- $COF_2$ --.

Signed and sealed this 29th day of August 1972.

(SEAL)
Attest:

EDWARD M. FLETCHER, JR.
Attesting Officer

ROBERT GOTTSCHALK
Commissioner of Patents